US011635281B2

(12) United States Patent
Moeller et al.

(10) Patent No.: US 11,635,281 B2
(45) Date of Patent: Apr. 25, 2023

(54) ARMOUR PLATE

(71) Applicant: SAINT-GOBAIN CENTRE DE RECHERCHES ET D'ETUDES EUROPEEN, Courbevoie (FR)

(72) Inventors: Malte Moeller, Roedental (DE); Gilles Rossiquet, Louzac Saint-André (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 1140 days.

(21) Appl. No.: 16/316,821

(22) PCT Filed: Jul. 7, 2017

(86) PCT No.: PCT/FR2017/000139
§ 371 (c)(1),
(2) Date: Jan. 10, 2019

(87) PCT Pub. No.: WO2018/011477
PCT Pub. Date: Jan. 18, 2018

(65) Prior Publication Data
US 2019/0234712 A1  Aug. 1, 2019

(30) Foreign Application Priority Data

Jul. 11, 2016 (FR) ...................... 1656644

(51) Int. Cl.
*F41H 5/04* (2006.01)
*C04B 35/565* (2006.01)
*C04B 35/63* (2006.01)
*C04B 38/00* (2006.01)
*C04B 37/00* (2006.01)
(Continued)

(52) U.S. Cl.
CPC ......... *F41H 5/0414* (2013.01); *C04B 35/565* (2013.01); *C04B 35/6263* (2013.01); *C04B 35/6316* (2013.01); *C04B 37/008* (2013.01); *C04B 38/00* (2013.01); *C04B 38/0051* (2013.01); *C04B 38/0058* (2013.01); *C04B 38/0074* (2013.01); *F41H 5/0428* (2013.01); *C04B 2111/00612* (2013.01); *C04B 2111/00974* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3272* (2013.01); *C04B 2235/349* (2013.01); *C04B 2235/3821* (2013.01); *C04B 2235/3826* (2013.01); *C04B 2235/3873* (2013.01); *C04B 2235/428* (2013.01); *C04B 2235/5427* (2013.01); *C04B 2235/5436* (2013.01); *C04B 2235/5445* (2013.01); *C04B 2235/5472* (2013.01); *C04B 2235/606* (2013.01); *C04B 2235/6027* (2013.01); *C04B 2235/656* (2013.01); *C04B 2235/658* (2013.01); *C04B 2235/72* (2013.01); *C04B 2235/722* (2013.01); *C04B 2235/728* (2013.01); *C04B 2235/75* (2013.01); *C04B 2235/767* (2013.01); *C04B 2235/77* (2013.01); *C04B 2235/786* (2013.01); *C04B 2235/94* (2013.01); *C04B 2235/95* (2013.01); *C04B 2235/96* (2013.01); *C04B 2237/00* (2013.01); *C04B 2237/02* (2013.01); *C04B 2237/365* (2013.01); *C04B 2237/368* (2013.01); *C04B 2237/704* (2013.01);
(Continued)

(58) Field of Classification Search
None
See application file for complete search history.

(56) References Cited

U.S. PATENT DOCUMENTS

| 4,415,632 A | 11/1983 | Luhleich et al. |
| 4,604,249 A | 8/1986 | Luhleich et al. |
| 4,987,033 A * | 1/1991 | Abkowitz ................. B22F 7/08 419/68 |
| 6,389,594 B1 | 5/2002 | Yavin |

(Continued)

FOREIGN PATENT DOCUMENTS

| EP | 1 380 809 A2 | 1/2004 |
| EP | 1 710 218 A1 | 10/2006 |

(Continued)

OTHER PUBLICATIONS

Vyshnyakov et al.; Influence of Structural and Technological Factors on the Efficiency of Armor Elements Based on Ceramics; Strength of Materials, vol. 36, No. 6, 2004, pp. 643-648 (Year: 2004).*
Machine Translation of Schiefer et al. (WO 1994027110 A1); Translated through Espacenet.com on Feb. 23, 2022 (Year: 1994).*
International Search Report as issued in International Patent Application No. PCT/FR2017/000139, dated Nov. 7, 2017.

*Primary Examiner* — Elizabeth Collister
(74) *Attorney, Agent, or Firm* — Pillsbury Winthrop Shaw Pittman LLP

(57) ABSTRACT

Antiballistic armour plate includes a ceramic body including a hard material, provided, on its inner face, with a back energy-dissipating coating. The ceramic body is monolithic. The constituent material of the ceramic body includes grains of ceramic material having a Vickers hardness that is higher than 15 GPa, and a matrix binding the grains, the matrix including a silicon nitride phase and/or a silicon oxynitride phase, the matrix representing between 5 and 40% by weight of the constituent material of the ceramic body. The maximum equivalent diameter of the grains of ceramic material is smaller than or equal to 800 micrometres. The constituent material of the ceramic body has an open porosity that is higher than 5% and lower than 14%. The metallic silicon content in the material, expressed per mm of thickness of the body, is lower than 0.5% by weight.

27 Claims, No Drawings

(51) Int. Cl.
*C04B 35/626* (2006.01)
*C04B 111/00* (2006.01)
*F41H 5/24* (2006.01)
*F41H 7/00* (2006.01)

(52) U.S. Cl.
CPC .............. *F41H 5/0421* (2013.01); *F41H 5/24* (2013.01); *F41H 7/00* (2013.01)

(56) References Cited

U.S. PATENT DOCUMENTS

| | | | |
|---|---|---|---|
| 6,408,733 B1 * | 6/2002 | Perciballi | F41H 5/0435 |
| | | | 2/2.5 |
| 6,895,851 B1 * | 5/2005 | Adams | F41H 5/0442 |
| | | | 428/548 |
| 2004/0197542 A1 * | 10/2004 | Benitsch | F41H 5/0414 |
| | | | 428/307.3 |
| 2010/0083428 A1 * | 4/2010 | McElroy | F41H 1/02 |
| | | | 2/456 |
| 2015/0315088 A1 * | 11/2015 | Pick | C04B 35/565 |
| | | | 501/89 |
| 2017/0299345 A1 * | 10/2017 | Waldrop | F41H 5/0471 |

FOREIGN PATENT DOCUMENTS

| | | |
|---|---|---|
| EP | 2 095 055 A2 | 9/2009 |
| FR | 2 953 512 A1 | 6/2011 |
| GB | 2 457 688 A | 8/2009 |
| JP | 2005-247622 A | 9/2005 |
| WO | WO-9427110 A1 * 11/1994 ............ C04B 35/584 |
| WO | WO 2008/130451 A2 | 10/2008 |
| WO | WO 2013/186453 A1 | 12/2013 |
| WO | WO 2014/096846 A1 | 6/2014 |

* cited by examiner

ARMOUR PLATE

CROSS-REFERENCE TO RELATED APPLICATIONS

This application is the U.S. National Stage of PCT/FR2017/000139, filed Jul. 7, 2017, which in turn claims priority to French patent application number 1656644 filed Jul. 11, 2016. The content of these applications are incorporated herein by reference in their entireties.

The invention relates to products having antiballistic properties, i.e. products that are sufficiently hard to justify their use in armor or shield elements.

The invention is particularly applicable to armor or shield elements allowing (land, sea or air) vehicles or fixed installations (in particular buildings, defensive walls or guard posts) to be protected.

In particular, with respect to armored vehicles that are protected from projectiles by such antiballistic products, the additional mass due to bearing armor is a primary consideration. Specifically, this additional mass may lead to an excessive increase in weight, and hinder the rapid movement of the vehicle and limit its radius of action.

Metals and alumina are commonly used as armor for vehicles. In particular, systems formed by what is referred to as a "mosaic" assembly of ceramic tiles having a determined polygonal shape and individually resisting the impact of a projectile are known. JP2005247622 describes for example an arrangement of such shapes having a width of 20 to 100 mm, with a thickness of a few mm.

This type of mosaic of tiles has the advantage of resisting successive hits (referred to as "multi-shot" or "multi-hit" protection). Although the probability of one and the same tile being hit in the same place twice is low and generally not taken into account in the standards, it is nonetheless turning out to be a substantial problem in the face of advancements in modern weaponry. However, assembling such "mosaic" structures is time-consuming and costly. Moreover, it can be difficult to maintain a low overall tolerance of the assembly since the tolerances of each tile add up to form the assembly. This has an effect on the width of the remaining spaces between the tiles (joint planes) formed by the assembly. Furthermore, if the assembly is also curved in shape, the spaces constitute a significant area of weakness in this protection system when it is struck by the projectile at these locations.

Other systems, referred to as monolithic systems, exist, these systems being formed of one piece or else of a very limited number of pieces having a large area, each monolith having an area that is larger than 150 cm$^2$, thereby decreasing the number of joints. Thus, a number of materials have been proposed for forming armor intended for personnel, the ratio of armor mass to protective area of which must remain low, typically lower than 50 kg/m$^2$, or non-personnel armor intended for vehicles or for fixed installations, the ratio of mass to protective area of which is typically higher than 60 kg/m$^2$. This ratio for non-personnel protection is necessary and calculated to resist munitions that have greater energy and/or piercing capability, or are of higher caliber, for example calibers of 12.7 mm, 14.5 mm or else 25 mm or even 30 mm.

By way of example:
for STANAG 4 protection (munition: 14.5 mm API B32), the ratio of the mass of the metal armor plate to the area subjected to the impact is typically of the order of 180 kg/m$^2$;
for STANAG 5 protection (munition: 25 mm caliber), the ratio is typically of the order of 200 kg/m$^2$;
for STANAG 6 protection (munition: 30 mm caliber), the ratio is typically of the order of 280 kg/m$^2$.

In particular, among those ceramic materials used for such an application, products based on silicon carbide (SiC) feature.

Publication WO 2013/186453 A1 describes such a product, the shape of the grains and the chemical composition of the product being specified so as to form armor or a shield element.

Publication EP 1380809 A2 further discloses a system including two layers of material, the denser first layer A formed on the surface by a carbide and a metal, for example a silicon carbide SiC and metallic silicon Si, and a more porous second layer B formed of carbide, for example silicon carbide.

Publication EP1710218A1 discloses a sintered material based on silicon nitride and tungsten carbide using additives such as rare-earth elements, or tungsten preferably added in oxide form.

Porous SiC products that can be used for vehicle armor are also known from U54604249 or U54415632, but this type of monolithic armor formulated in such a way cannot resist a second hit, the constituent ceramic of the armor being overly fragmented after a first hit under standard conditions known to those skilled in the art such as according to the STANAG 4569 and AEP 55 standards (in particular protection level 4, in which the maximum distance between the first two successive hits is 10 cm with a 14.5 mm API B32 projectile). This standard represents a challenge with regard to multi-hit resistance for those skilled in the art.

U.S. Pat. No. 6,389,594B1 provides an outer envelope (or "outer shell") for the monolithic ceramic armor, which is placed under compressive strain. This envelope is produced in a polymer material based on aramid or on other antiballistic materials in particular based on glass fibers. This outer envelope does not prevent the monolithic block from fracturing and if the size of this block is greater than 100 cm$^2$ and/or if the projectile is a high-caliber projectile, then due to the large amount of energy to be dissipated, the "blocking" effect is too weak, the decohesion of the monolithic block is substantial and resistance to multiple hits remains low.

More recently, WO2008/130451 (EP2095055A1) has proposed an approach consisting in decreasing the propagation of the stress wave caused by the impact of the projectile by using an envelope formed this time of a permeable medium, typically a layer of organic (for example aramid) fibers, which layer is attached to the ceramic tile and then impregnated with a hyperelastic polymer to absorb the energy caused by the impact of the projectile and to decrease the propagation of cracks in and the multifracturing of the ceramic. This system is only of interest for ceramic tiles that are also of small size and the tested example is formed from an assembly of nine ceramic tiles of 100 mm*100 mm*8 mm in size. The energy absorbed by this new envelope cannot prevent the decohesion of a ceramic block having an area greater than 150 cm$^2$.

Patent application WO2014/096846 describes materials exhibiting high mechanical strength, consisting of a silicon carbide phase, of a SiAlON phase and of an intergranular binder phase comprising at least one rare-earth element. The binder phase according to the present invention is a silicon nitride or silicon oxynitride phase and does not comprise such a binder phase comprising at least one rare-earth element.

There is therefore a continual need to improve the products used as armor, this improvement being measured in particular by their ballistic performance. The object of the present invention is therefore to provide a new product, one which is different from the products currently used in the field and exhibiting improved performance, in particular in terms of ability to resist piercing, even under the successive impact of two projectiles in one and the same region of the armor.

In particular, there is currently a need for monolithic ceramic armor having an area that is greater than 150 cm$^2$, preferably greater than 200 cm$^2$, or even greater than 500 cm$^2$ or even greater than 1000 cm$^2$, which is capable of resisting fragmentation after at least two successive hits by piercing projectiles having a diameter that is greater than or equal to 12.7 mm in one and the same region of the armor, but which nonetheless has a low bulk density, typically lower than 3.5 g/cm$^3$, or even lower than 3.3 g/cm$^3$, for the purpose of protecting (land, sea or even air) vehicles or fixed installations, such as buildings, without overly encumbering them.

According to a first general aspect, the present invention relates to an antiballistic armor plate including a ceramic body consisting of a hard material, provided, on its inner face, with a back energy-dissipating coating, preferably consisting of a material having a hardness that is lower than that of the constituent material of the ceramic body.

In a plate according to the invention:
- said ceramic body is monolithic and has an area that is larger than 150 cm$^2$, a thickness that is greater than 12 mm and a bulk density that is lower than 3.5 g/cm$^3$;
- the constituent material of the ceramic body comprises grains of ceramic material having a Vickers hardness that is higher than 15 GPa, and a matrix binding said grains, said matrix comprising or consisting of a silicon nitride phase and/or a silicon oxynitride phase, said matrix representing between 5 and 40%, preferably between 15 and 35%, by weight of said constituent material of the ceramic body;
- said grains of ceramic material have a maximum equivalent diameter that is smaller than or equal to 800 micrometers, preferably smaller than or equal to 500 micrometers, or even smaller than or equal to 300 micrometers;
- said constituent material of the ceramic body has an open porosity that is higher than 5% and lower than 14%;
- the metallic silicon content in said material, expressed per mm of thickness of said body, is lower than 0.5% by weight.

Various preferred embodiments of the present invention are described below, which embodiments can of course, where appropriate, be combined with one another:
- said grains of ceramic material have a maximum equivalent diameter that is larger than 5 micrometers, preferably larger than 10 micrometers or even larger than 50 micrometers;
- the constituent material of the ceramic body comprises grains of a metal carbide or boride, more preferably grains of silicon or boron carbide or a mixture of these two carbides and preferably comprises only grains of silicon carbide;
- said constituent material of the ceramic body has an open porosity that is higher than 6%, more preferably higher than 7% or even higher than 8%;
- said constituent material of the ceramic body has an open porosity that is lower than 13%, more preferably higher than 12%;
- the constituent material of the ceramic body comprises grains of ceramic material having a Vickers hardness that is higher than 20 GPa;
- said ceramic body has an area that is larger than 500 cm$^2$, more preferably larger than 1000 cm$^2$;
- said ceramic body has a thickness that is greater than 15 mm, more preferably greater than 20 mm;
- said ceramic body has a bulk density that is lower than 3.2 g/cm$^3$, preferably a bulk density that is lower than 3.0 g/cm$^3$;
- the metallic silicon content in said material, per mm of thickness of said body, is lower than 0.4% by weight, more preferably lower than 0.2% by weight, or more preferably still lower than 0.1% by weight;
- the metallic silicon content in said material, per mm of thickness of said body, is higher than 0.005% by weight, more preferably higher than 0.01% by weight;
- the matrix represents between 5 and 40% by weight of said constituent material of the ceramic body;
- the metallic silicon is present in said constituent material of the ceramic body along a concentration gradient from the outer edges to the core of said body, in the direction of its thickness;
- said phase in the matrix is chosen from $Si_3N_4$, $Si_2ON_2$ or SiMON, where M is a metal chosen from Ca, Mg, Sr, Ba;
- the plate has a mass-to-area ratio, measured in kg/m$^2$, that is higher than 60 and preferably lower than 200;
- the total sum of rare-earth elements in the constituent material of the ceramic body is lower than 0.05% by weight, more preferably lower than 0.01% by weight;
- the constituent grains of the ceramic material consist essentially of SiC, preferably in the alpha form;
- the maximum equivalent diameter of the grains, in particular of SiC, in the constituent material of the ceramic body is comprised between 10 micrometers and 500 micrometers, preferably comprised between 50 and 300 micrometers, or even between 100 micrometers and 200 micrometers;
- the constituent material of the ceramic body contains no elements from the group of the rare-earth elements;
- the constituent material of the ceramic body contains no yttrium;
- the constituent material of the ceramic body contains no lanthanum;
- the constituent material of the ceramic body contains no elements from the group of the actinides;
- the mean equivalent diameter of the constituent grains of the ceramic material is larger than 5 micrometers and smaller than 300 micrometers, preferably comprised between 50 and 200 micrometers;
- the total metallic silicon content of the constituent material of the ceramic body is lower than 10% by total weight, preferably lower than 5% by total weight, or even lower than 1% by total weight;
- the nitrogen content in the constituent material of the ceramic body is higher than 4% by weight;
- the binding matrix primarily consists of silicon nitride, in particular with the formula $Si_3N_4$, and/or silicon oxynitride $Si_2ON_2$, and preferably primarily consists of silicon nitride, in particular with the formula $Si_3N_4$;
- the total metallic aluminum content of the constituent material of the ceramic body is lower than 1% by total weight, preferably lower than 0.5% by total weight.

alternatively, the binding matrix comprises or primarily consists of a SiMON phase, where M is a metal chosen from Ca, Mg, Sr, Ba, preferably where M is Mg;

the constituent material of the back coating is chosen from the polyethenes PE, in particular ultra-high-molecular-weight polyethenes (UHMPEs), glass or carbon fibers, aramids, metals such as aluminum, titanium or their alloys, or steel;

the ceramic body-back coating assembly is surrounded by an envelope of a confining material;

the constituent material of the envelope is chosen from the polyethenes PE, in particular ultra-high-molecular-weight polyethenes (UHMPEs), glass or carbon fibers, aramids, metals such as aluminum or steel.

The invention also relates to the ceramic body, the features of which have been described above, and in particular to a monolithic ceramic body in the form of a plate, having an area that is larger than 150 cm² and a thickness that is greater than 12 mm, and a bulk density that is lower than 3.5 g/cm³, consisting of a material comprising:

grains of ceramic material having a Vickers hardness that is higher than 15 GPa, preferably a metal carbide or boride, more preferably a silicon or boron carbide or a mixture of these two carbides, the maximum equivalent diameter of said grains being smaller than or equal to 500 micrometers; and a matrix binding said grains, said matrix comprising or consisting of a silicon nitride and/or silicon oxynitride phase, said matrix representing between 5 and 40% by weight of said constituent material of the ceramic body;

said ceramic material having an open porosity that is higher than 5% and lower than 14% and a metallic silicon content in said material, expressed per mm of thickness of said body, that is lower than 0.5% by weight.

Without having to repeat here, for the sake of conciseness, all of technical features already described above in relation to the armor plate, a ceramic body according to the invention of course covers all of the same preferred embodiments.

The following designations and definitions are given, in connection with the preceding description of the present invention:

The grain equivalent diameter is understood to mean the half-sum of the greatest length of the grain and of the greatest width of the grain, measured in a direction perpendicular to said greatest length.

A hard material is understood to mean a material that is sufficiently hard to justify its use in armor or shield elements.

The maximum and mean equivalent diameters are conventionally determined from observation of the microstructure of the constituent sintered material of the ceramic body, conventionally using images taken by SEM (scanning electron microscopy) on a cross section of the sintered product. It has been verified in the examples that follow that said microstructure is substantially identical, irrespective of the orientation of the cross section.

The bulk density of a product is understood, within the meaning of the present invention, to mean the ratio equal to the mass of the product divided by the volume that said product occupies. It is conventionally determined by the Archimedes method. Standard ISO 5017 specifies, for example, the conditions for such a measurement. This standard also makes it possible to measure the open porosity within the meaning of the present invention.

A "matrix" of the ceramic body is understood to mean a crystalline or noncrystalline phase which provides a substantially continuous structure between the grains and which is obtained, during sintering, from the constituents of the starting feedstock and potentially from the constituents of the gaseous environment of this starting feedstock. A matrix substantially surrounds the grains of the granular fraction, i.e. it coats them.

In a sintered ceramic body according to the invention, the ceramic grains are bound by the matrix. During sintering, they substantially retain the shape and the chemical properties that they had in the starting feedstock. In the sintered ceramic body, the matrix and the grains together represent 100% of the mass of the product.

A matrix obtained by reactive sintering exhibits distinctive features. In particular, during reactive sintering, the precursor metals of the nitrogen-containing crystalline phases are nitrided. The resulting increase in volume, typically from 1 to 30%, advantageously makes it possible to fill in the pores of the matrix and/or to compensate for the shrinkage caused by sintering the grains. Reactive sintering thus allows the mechanical strength of the sintered product to be improved. Reactively sintered products thus exhibit a significantly lower degree of closed porosity than that/those of other products sintered under similar temperature and pressure conditions. Upon firing, reactively sintered products exhibit substantially no shrinkage.

The phase composition of the constituent material of the monolithic ceramic body is normally obtained by X-ray diffraction and Rietveld analysis.

The elementary nitrogen (N) contents in the sintered products have been measured by means of LECO analyzers (LECO TC 436DR; LECO CS 300). The values are provided as percentages by weight.

The crystalline phases, in particular the nitrogen-containing crystalline phases, have been measured by X-ray diffraction and quantified according to the Rietveld method.

The residual metallic silicon in the sintered material or after firing is normally measured according to the method known to those skilled in the art and referenced under ANSI B74-151992 (R2000).

In the ceramic material according to the invention, the residual silicon content is generally at maximum in the core of the ceramic body, i.e. substantially in the middle of its thickness.

The Applicant Company has also been able to determine that the antiballistic properties of the ceramic material are highly dependent upon the residual silicon content. The residual metallic aluminum in the sintered material or after firing may be measured by X-ray diffraction and quantified according to the Rietveld method.

The Vickers hardness of the ceramic grains may be measured using a standardized pyramidal diamond tip having a square base and an angle at the apex between faces that is equal to 136°. The imprint made in the grain is therefore square in shape; the two diagonals d1 and d2 of this square are measured using an optical device. The hardness is calculated on the basis of the force applied to the diamond tip and the mean value d of $d_1$ and $d_2$ according to the following formula:

$$H_V = 0.189 \cdot \frac{F}{d^2}$$

where $H_V$ = Vickers hardness $F$ = Force applied [$N$]

$d$ = Mean of the diagonals of the imprint [mm]

The force and the duration of application are also standardized. The reference standard is the ASTM C1327 standard: Standard Test Method for VICKERS Indentation Hardness of Advanced Ceramics.

The expressions "containing a", "comprising a" or "having a" are understood to mean "comprising at least one", unless otherwise indicated.

Unless otherwise indicated, in the present description, all of the percentages are percentages by weight.

The product according to the invention makes it possible to protect against any type of projectile, for example a bullet, a shell, a mine or an element thrown out during the detonation of explosives, such as bolts, nails (or IED for "improvised explosive device") and normally constitutes an armor element for vehicles, generally in the form of modules such as plates.

According to the invention, the protective plate conventionally comprises at least two layers: a first ceramic tile such as described above in association with another, less hard and preferably ductile, material on the back face, conventionally referred to as "backing", such as polyethene (e.g.: Tensylon™, Dyneema®, Spectra™) fibers, aramid (e.g.: Twaron™, Kevlar®) fibers, glass fibers, or metals such as for example steel or aluminum alloys, in the form of plates. Adhesives, for example based on polyurethane or epoxide polymers, are used to bond the various constituent elements of the armor plate.

Under the impact of projectiles, the ceramic material fragments and its main purpose is to break the cores of the projectiles. The purpose of the back face, associated with the constituent ceramic material of the ceramic body, is to absorb the kinetic energy of the debris and to maintain a certain level of confinement of the ceramic plate, which is further optimized by the confining envelope.

The Applicant Company has thus developed a new armor element comprising a shield element including a ceramic plate that is capable of resisting at least two successive hits according to the STANAG 4569 and AEP 55 standards, specifically protection level 4, or even 5 and 6.

Armor of this type intended for the applications mentioned above could have a ratio of mass to armor area that is typically higher than 60 kg/m$^2$ but is minimized with respect to the currently available plates for the same level of antiballistic performance. This results in a decrease in the weight of the armor for the same level of protection.

A ceramic body according to the invention may in particular be obtained by means of a sintering process, in particular a reactive sintering process comprising the following steps:
a) preparing a starting feedstock including:
   at least one powder of particles of silicon carbide;
   a powder comprising metallic silicon;
   optionally, a powder of a solid-phase sintering additive;
b) shaping the starting feedstock into the form of a preform;
c) removal from the mold after setting or drying;
d) optionally, drying the preform, preferably until the residual moisture content is comprised between 0 and 0.5% by weight;
e) firing and sintering the preform under a nitrogen atmosphere, or under a non-oxidizing atmosphere if nitrogen is present in the starting feedstock, preferably at a temperature comprised between 1300 and 1600° C., so as to obtain the sintered product.

In such a process, at least one initial silicon carbide powder is used, the median diameter of the particles of which is comprised between 10 micrometers and 500 micrometers, and preferably comprised between 50 and 300 micrometers. In certain advantageous embodiments, a second silicon carbide powder is used, the median size of which is at least two times smaller than the first and the mean diameter of which is preferably comprised between 1 and 5 micrometers.

In step b), the preform may be obtained by casting or pressing the feedstock or mixture in a mold, with or without vibration.

During the firing in step e), the nitrogen of the firing oven reacts ("reactive sintering") with some of the constituents of the preform, in particular with the metallic silicon or with metallic aluminum, if this is present either alone or in the form of an alloy with the silicon, and also with calcined alumina or an aluminum silicate, for example clay, if these additions are present, to form a matrix and thus bind the grains of the ceramic body.

In the ceramic body according to the invention, the ceramic grains, preferably grains of silicon and/or boron carbide, may be bound by a matrix comprising or consisting primarily of a silicon nitride or silicon oxynitride phase without the addition of compounds based on rare-earth elements and without resorting to a high sintering temperature, i.e. a temperature higher than 1650° C. In particular, a preform may be fired under a nitrogen atmosphere at between 1360 and 1500° C. for a sufficiently long hold (for example for at least 4 hours) to obtain a sintered ceramic body having a metallic Al and Si content that is lower than 1% by weight.

The median diameter (or the median "size") of the constituent particles of a powder is given within the meaning of the present invention by a characterization of particle size distribution. A laser particle sizer allows sizes smaller than or equal to 3 mm to be measured.

The particle size distribution is conventionally characterized using a laser particle sizer according to the ISO 13320-1 standard. The laser particle sizer may be, for example, a Partica LA-950 from Horiba. Within the meaning of the present description and unless otherwise indicated, the median diameter of the particles refers to the diameter of the particles below which 50% by weight of the population is found, respectively.

The "median diameter" or "median size" of an assembly of particles, in particular of a powder, refers to the $D_{50}$ percentile, i.e. the size that divides the particles into first and second populations of equal volume, these first and second populations only comprising particles having a size greater than or less than the median size, respectively.

The initial mixture may also comprise a fraction of an alumina powder having a median diameter comprised between 1 and 10 micrometers, acting as a sintering agent.

The ceramic body according to the invention is in particular obtained by means of a process such as described above, preferably in the presence of a sintering additive chosen from carbon, boron carbide, titanium carbide, zirconium carbide, or zirconium boride, titanium boride, either alone or as a mixture.

In one particularly preferred embodiment, the product is obtained using a process such as described above in which the sintering additive comprises or consists of boron carbide B4C.

A sintering additive, often more simply referred to as an "additive" in the present description, is understood to mean a compound customarily known for enabling and/or accelerating the kinetics of the sintering reaction.

In one embodiment, the starting feedstock contains a binder and/or a lubricant and/or a surfactant. In one embodiment, the starting feedstock does not contain a binder.

Mixing is carried out so as to obtain a high degree of uniformity of distribution of the various elements, it being possible to adjust the mixing time in order to achieve this result.

Preferably, the mixing of the initial reactants is carried out in a jar mill, the mixing time being longer than 15 hours. A mixing time of 24 hours is highly suitable. Once the mixture has been obtained, it may be atomized or granulated, for example by freeze granulation, in order to obtain granules that will be shaped, for example by pressing, so as to obtain a ceramic preform. Other shaping techniques may be used, such as injection or barbotine casting. After shaping, the preform may be machined.

The preform is then sintered. Sintering is performed under a nitrogen atmosphere.

Preferably, the elemental oxygen content of the silicon carbide powder is lower than 2%, preferably lower than 1.6%, preferably lower than 1.4%, preferably lower than 1.2%, preferably lower than 1%, or even lower than 0.7%, or even lower than 0.5% or even lower than 0.3% by weight. In one embodiment, the elemental oxygen content of the silicon carbide powder may be decreased before use by means of any technique known to those skilled in the art, for example acid washing.

In one embodiment, the aluminum content of the starting feedstock is lower than 1000 ppm, or even lower than 500 ppm, or even lower than 300 ppm, relative to the weight of the starting feedstock.

Firing takes place under a controlled atmosphere, preferably under nitrogen, to obtain the nitrided intergranular phase.

The term "sintering" refers to a heat treatment via which the product forms a microstructure consisting of a granulate or granular fraction, the grains of which are held together by means of a matrix. A sintered product according to the invention includes a matrix containing at least one silicon nitride or oxynitride phase, obtained by sintering under a non-oxidizing atmosphere if nitrogen is introduced by at least one of the constituents of the starting feedstock, or by sintering under nitrogen, preferably at a temperature comprised between 1300 and 1600° C., the latter type of process, allowing reactive sintering under nitrogen, being well known to those skilled in the art.

"Sintering under nitrogen" is understood to mean sintering in a gaseous environment including more than 90%, preferably more than 95% or, more preferably, substantially 100% nitrogen, as percentage by volume. Such a gaseous environment is referred to as a "nitrogenous environment".

The term "residual" qualifies a constituent present in the starting feedstock and still present in the sintered product obtained from this starting feedstock.

"Impurities" is understood to mean the unavoidable constituents, introduced unintentionally and necessarily with the starting materials or resulting from reactions with these constituents. The impurities are not necessary constituents but merely tolerated constituents. Such an impurity consists in particular of silica, which is disadvantageously known to inhibit the sintering of SiC or else aluminum. Without departing from the scope of the invention, it is possible to limit the silica impurity by washing the SiC powders or even the sintering additive in a prior step and/or by adding carbon-containing additives to the initial mixture, to remove it during sintering.

The following examples are given purely by way of illustration and do not limit, under any of the described aspects, the scope of the present invention.

EXAMPLES

In all of the following examples, a ceramic tile in the form of a plate having a 500 mm×500 mm×26 mm format has initially been produced by casting, in a plaster mold, a suspension according to the process described above and the formulations described in table 1 below.

The ceramic body thus obtained is used as a ceramic plate in an armor plate. More specifically, said ceramic body is bonded, using an epoxy adhesive, to a glass fiber layer forming the link with a plate of ultra-high-molecular-weight polyethene (UHMWPE) marketed by DSM Dyneema. The assembly is enveloped in a Kevlar layer that is also bonded by means of an epoxy resin. The initial formulation of the various mixtures and the exact conditions of the process for obtaining the armor plate are given in table 1.

Comparative example 4 has been produced according to the principles described in application JP2005247622 mentioned above.

Its purpose is to demonstrate the multi-hit resistance of an assembly of ceramic elements put together in the form of a mosaic, each individual ceramic element of the ceramic being produced according to the same process and using the same material as example 1 according to the invention.

The tiles used in this mosaic assembly have an individual size of 3 cm by 3 cm and have been assembled into a plate of 50 cm×50 cm according to the process described in example 1 of JP2005247622.

Comparative example 5 consists of an antiballistic plate that is primarily made of metal produced according to conventional techniques based on combining a 10 mm-thick steel plate marketed by Thyssen under the reference Secure 500®, and a 20 mm back coating of styrofoam bonded by means of an epoxy adhesive, another 10 mm-thick Secure 500 steel plate and a 15 mm bonded Twaron® (Teijin) T750 aramid coating. The overall assembly is enveloped in a layer of Dupont Kevlar®, also bonded by an epoxy resin.

For each embodiment, the properties of the ceramic body and the composition of the various constituent materials thereof are collated in table 2.

The ballistic properties of the final armor plate are collated in table 3. The ballistic performance of the various armor plates has been evaluated using the AEP 55 and STANAG 4569 standards, specifically ballistic protection level 4 (14.5 mm API B32 projectile). Four shots have been fired at the various armor plates in stand-alone configuration while observing the protocols and directives described in the AEP 55 and STANAG 4569 standards (firing speed, distance between impacts, verification of piercing or otherwise using the control plate, etc.).

The results given in the following tables 1 to 3 show the advantages provided by using a monolithic armor plate of large size according to the invention: examples 1 to 3 according to the invention exhibit improved resistance to piercing such that they are capable of resisting successive projectile impacts. Their ballistic resistance thus appears to be substantially equivalent to steel-based plates as illustrated by comparative example 5. The mass-to-area ratio of the plates according to the invention is however much lower than that of such steel-based plates, as illustrated in table 3.

The comparative examples further show the influence of the parameters on the ultimate ballistic performance levels obtained for the armor plate:

Comparative example 1 shows that the level of residual silicon, i.e. metallic silicon that has not reacted with nitrogen during firing, must be minimized down to the core of the constituent material of the ceramic body. In particular, when the heat treatment is not suitable and the level of residual metallic silicon in the material is too high (0.5% residual silicon per mm of thickness of the ceramic body), in particular in the core of the ceramic body (i.e. substantially in the middle of the thickness of the ceramic plate), the result is lower resistance to piercing, as can be seen in the ballistic test results given in table 3.

According to comparative example 2, the constituent grains of the constituent material of the ceramic body are larger in size than according to the present invention, resulting in poorer ballistic performance. Thickening the ceramic plate according to comparative example 3 does not compensate for this deficiency.

Comparative example 4 further shows that a mosaic structure according to the prior art exhibits much lower levels of ballistic performance with respect to plates of large size according to the invention.

Of course, the present invention is not limited to the described and represented embodiments provided by way of examples. In particular, combinations of the various described embodiments also come within the scope of the invention.

Neither is the invention limited by the shape or the dimensions of the sintered product based on silicon carbide.

TABLE 1

| | invention example 1 | invention example 2 | invention example 3 | comparative example 1 | comparative example 2 | comparative example 3 | comparative example 4 |
|---|---|---|---|---|---|---|---|
| Composition of the initial mixture (% by weight) | | | | | | | |
| SiC powder 100 µm–1100 µm $D_{50}$ = 600 µm | | | | | 80.2 | 80.2 | |
| SiC powder 20–200 µm $D_{50}$ = 100 µm | | | 39.5 | | | | |
| SiC powder 10–150 µm $D_{50}$ = 75 µm | 39.5 | 39.5 | | 39.5 | | | 39.5 |
| SiC powder 0.1–5 µm $D_{50}$ = 2.5 µm | 37.5 | 37.5 | 37.5 | 37.5 | | | 37.5 |
| Si powder 0.5–50 µm $D_{50}$ = 20 µm | 17 | 17 | 17 | 17 | 16.0 | 16.0 | 17 |
| Calcined clay | | | | | 3.0 | 3.0 | |
| Alumina powder $D_{50}$ = 2.5 µm | 5.0 | 5.0 | 5.0 | 5.0 | | | 5.0 |
| $Fe_2O_3$ 2.5 µm | 0.5 | 0.5 | 0.5 | 0.5 | | | 0.5 |
| $B_4C$ 95% < 45 µm $D_{50}$ = 18 µm | 0.5 | 0.5 | 0.5 | 0.5 | 0.8 | 0.8 | 0.5 |
| total minerals % | 100 | 100 | 100 | 100 | 100 | 100 | 100 |
| added water % | 12.5 | 12.5 | 12.5 | 12.5 | 6 | 6 | 12.5 |
| added dispersant | 0.5 | 0.5 | 0.5 | 0.5 | 0.2 | 0.2 | 0.5 |
| Shaping conditions | | | | | | | |
| Drying (T°/duration) | 110° C./24 h | 110° C./24 h | 110° C./24 h | 110° C./24 h | 110° C./24 h | 110° C./24 h | 110° C./24 h |
| Firing (T°/duration/time) | 1420° C./8 h/ Nitrogen | 1420° C./4 h/ Nitrogen | 1420° C./8 h/ Nitrogen | 1350° C./4 h/ Nitrogen | 1420° C./8 h/ Nitrogen | 1420° C./8 h/ Nitrogen | 1420° C./8 h/ Nitrogen |

TABLE 2

| | invention example 1 | invention example 2 | invention example 3 | comparative example 1 | comparative example 2 | comparative example 3 | comparative example 4 |
|---|---|---|---|---|---|---|---|
| Ceramic material body properties | | | | | | | |
| thickness (mm) | 26 | 26.5 | 25.7 | 27 | 27 | 35 | 26 |
| Shape of plate | monolithic | monolithic | monolithic | monolithic | monolithic | monolithic | mosaic |
| area ($cm^2$) | 50 × 50 | 50 × 50 | 50 × 50 | 50 × 50 | 50 × 50 | 50 × 50 | 3 × 3 |
| Granular fraction (nature/relative weight) | SiC/75% | SiC/75% | SiC/77% | SiC/75% | SiC/75% | SiC/75% | SiC/75% |
| Maximum equivalent diameter of SiC grains in material | 0.150 mm | 0.150 mm | 0.2 mm | 0.150 mm | 1.1 mm | 1.1 mm | 0.150 mm |
| Mean equivalent diameter of SiC grains in material | 30 µm | 30 µm | 80 µm | 30 µm | 600 µm | 600 µm | 30 µm |
| Matrix binding grains (nature/relative weight) | $Si_3N_4$*/25% | $Si_3N_4$*/25% | $Si_3N_4$*/22% | $Si_3N_4$*/25% | $Si_3N_4$*/25% | $Si_3N_4$*/25% | $Si_3N_4$*/25% |
| open porosity % | 10 | 11.5 | 9 | 13 | 14 | 14 | 9.7 |
| bulk density % | 2.81 | 2.75 | 2.84 | 2.7 | 2.67 | 2.67 | 2.83 |

TABLE 2-continued

|  | invention example 1 | invention example 2 | invention example 3 | comparative example 1 | comparative example 2 | comparative example 3 | comparative example 4 |
|---|---|---|---|---|---|---|---|
| N content | 10% | 5% | 9% | 3.5% | 10% | 10% | 10% |
| % residual Si (in the material) | <0.5 | 9 | 0.7 | 13.5 | <0.5 | <0.5 | <0.5 |
| % residual Si/mm thickness | <0.02 | 0.35 | 0.03 | 0.50 | <0.02 | <0.02 | <0.02 |
| Back coating properties | | | | | | | |
| Chemical nature | Glass fibers + high-molecular-weight PE | Glass fibers + high-molecular-weight PE | Glass fibers + high-molecular-weight PE | Glass fibers + high-molecular-weight PE | Glass fibers + high-molecular-weight PE | Glass fibers + high-molecular-weight PE | Glass fibers + high-molecular-weight PE |
| Thickness | 21 mm | 21 mm | 21 mm | 21 mm | 21 mm | 21 mm | 21 mm |
| Confining envelope properties | | | | | | | |
| Chemical nature | Aramid fibers (Kevlar®) | Kevlar® | Kevlar® | Kevlar® | Kevlar® | Kevlar® | Kevlar® |

*23% $Si_3N_4$ by weight, 2% $Si_2ON_2$ by weight

TABLE 3

|  | invention example 1 | invention example 2 | invention example 3 | comparative example 1 | comparative example 2 | comparative example 3 | comparative example 4 | comparative example 5 |
|---|---|---|---|---|---|---|---|---|
| Armor plate properties | | | | | | | | |
| mass-to-area ratio | 95 | 95 | 95 | 95 | 94 | 115 | 96 | 175 |
| Ballistic tests | | | | | | | | |
| Visual inspection after firing | No piercing | No piercing | No piercing | Piercing | Piercing | Piercing | Piercing | No piercing |

The invention claimed is:

1. An antiballistic armor plate including a ceramic body consisting of a hard material, provided, on its inner face, with a back energy-dissipating coating, wherein:
said ceramic body is monolithic and has an area that is larger than 150 $cm^2$, a thickness that is greater than 12 mm and a bulk density that is lower than 3.5 $g/cm^3$;
the constituent material of the ceramic body comprises grains of ceramic material having a Vickers hardness that is higher than 15 GPa, and a matrix binding said grains, said matrix consisting of one or more phases selected from the group consisting of a silicon nitride phase, a SiMON phase, where M is a metal chosen from Ca, Mg, Sr and Ba, and a silicon oxynitride ($Si_2ON_2$) phase, said matrix representing between 15 and 40% by weight of said constituent material of the ceramic body;
a maximum equivalent diameter of said grains of ceramic material is smaller than or equal to 800 micrometers;
said constituent material of the ceramic body has an open porosity that is higher than 5% and lower than 14%;
a metallic silicon content in said material, expressed per mm of thickness of said body, is lower than 0.5% by weight.

2. The armor plate as claimed in claim 1, wherein the constituent grains of the ceramic material consist essentially of SiC.

3. The armor plate as claimed in claim 1, wherein the maximum equivalent diameter of the grains in said constituent material of the ceramic body is comprised between 10 micrometers and 500 micrometers.

4. The armor plate as claimed in claim 1, wherein the constituent material of the back energy-dissipating coating is chosen from polyethenes PE, glass or carbon fibers, aramids, metals, or steel.

5. The armor plate as claimed in claim 4, wherein the polyethenes PE are ultra-high-molecular-weight polyethenes (UHMPEs).

6. The armor plate as claimed in claim 4, wherein the metals are aluminum, titanium or their alloys.

7. The armor plate as claimed in claim 1, wherein an assembly formed by the ceramic body and back energy-dissipating coating is surrounded by an envelope of a confining material.

8. The armor plate as claimed in claim 7, wherein the constituent material of the envelope is chosen from polyethenes PE, glass or carbon fibers, aramids, metals or steel.

9. The armor plate as claimed in claim 8, wherein the constituent material of the envelope is chosen from ultra-high-molecular-weight polyethenes (UHMPEs).

10. The armor plate as claimed in claim 8, wherein the metal is aluminum.

11. The armor plate as claimed in claim 2, wherein the SiC is in the alpha form.

12. The armor plate as claimed in claim 1, wherein the metallic silicon is present in said constituent material of the ceramic body along a concentration gradient from the outer edges to the core of said body, in the direction of its thickness.

13. The armor plate as claimed in claim 1, which has a mass-to-area ratio, measured in $kg/m^2$, that is higher than 60.

14. The armor plate as claimed in claim 13, wherein the mass-to-area ratio, measured in kg/m$^2$, is lower than 200.

15. The armor plate as claimed in claim 1, wherein a total sum of rare-earth elements in the constituent material of the ceramic body is lower than 0.05% by weight.

16. The armor plate as claimed in claim 1, wherein the constituent material of the ceramic body contains no elements from the group of the rare-earth elements.

17. The armor plate as claimed in claim 16, wherein the constituent material of the ceramic body contains no yttrium and/or no lanthanum.

18. The armor plate as claimed in claim 16, wherein the constituent material of the ceramic body contains no elements from the group of the actinides.

19. The armor plate as claimed in claim 1, wherein a mean equivalent diameter of the constituent grains of the ceramic material is larger than 5 micrometers and smaller than 300 micrometers.

20. The armor plate as claimed in claim 1, wherein the metallic silicon content of the constituent material of the ceramic body is lower than 10% by weight.

21. The armor plate as claimed in claim 1, wherein a nitrogen content in the constituent material of the ceramic body is higher than 4% by weight.

22. The armor plate as claimed in claim 1, wherein the binding matrix consists of silicon nitride $Si_3N_4$ and/or silicon oxynitride $Si_2ON_2$.

23. The armor plate as claimed in claim 22, wherein the binding matrix consists of silicon nitride $Si_3N_4$.

24. The armor plate as claimed in claim 1, wherein the back energy-dissipating coating consists of a material having a hardness that is lower than that of the constituent material of the ceramic body.

25. A monolithic ceramic body in the form of a plate and having an area that is larger than 150 cm$^2$ and a thickness that is greater than 12 mm, and a bulk density that is lower than 3.5 g/cm$^3$, consisting of a material comprising:

grains of ceramic material having a Vickers hardness that is higher than 15 GPa, a maximum equivalent diameter of said grains being smaller than or equal to 500 micrometers; and a matrix binding said grains, said matrix consisting of a silicon nitride phase or a SiMON phase, where M is a metal chosen from Ca, Mg, Sr and Ba, or a silicon oxynitride ($Si_2ON_2$) phase, or a mixture thereof, said matrix representing between 15 and 40% by weight of said constituent material of the ceramic body;

said ceramic material having an open porosity that is higher than 5% and lower than 14% and a metallic silicon content in said material, expressed per mm of thickness of said body, that is lower than 0.5% by weight.

26. The monolithic ceramic body as claimed in claim 25, wherein the ceramic material is metal carbide or boride.

27. The monolithic ceramic body as claimed in claim 25, wherein the ceramic material is silicon carbide or boron carbide or a mixture of these two carbides.

* * * * *